United States Patent
Lechner et al.

(10) Patent No.: US 10,689,726 B2
(45) Date of Patent: Jun. 23, 2020

(54) METHOD FOR PRODUCING HOT-FORMED STEEL SPRINGS

(71) Applicants: ThyssenKrupp Federn und Stabilisatoren GmbH, Hagen (DE); ThyssenKrupp AG, Essen (DE)

(72) Inventors: Dieter Lechner, Düsseldorf (DE); Marcel Groß, Dortmund (DE); Heinz-Georg Gabor, Wetter (DE); Marco Roland, Dortmund (DE); Dieter Brier, Werdohl (DE)

(73) Assignees: THYSSENKRUPP FEDERN UND STABILISATOREN GMBH, Hagen (DE); THYSSENKRUPP AG, Essen (DE)

(*) Notice: Subject to any disclaimer, the term of this patent is extended or adjusted under 35 U.S.C. 154(b) by 340 days.

(21) Appl. No.: 15/509,005

(22) PCT Filed: Jul. 15, 2015

(86) PCT No.: PCT/EP2015/066154
§ 371 (c)(1),
(2) Date: Mar. 6, 2017

(87) PCT Pub. No.: WO2016/034318
PCT Pub. Date: Mar. 10, 2016

(65) Prior Publication Data
US 2017/0275721 A1  Sep. 28, 2017

(30) Foreign Application Priority Data

Sep. 4, 2014 (DE) .................. 10 2014 112 761
Sep. 4, 2014 (DE) .................. 10 2014 112 762

(51) Int. Cl.
*C21D 9/02* (2006.01)
*C21D 11/00* (2006.01)
(Continued)

(52) U.S. Cl.
CPC ............... *C21D 9/525* (2013.01); *B21F 3/02* (2013.01); *C21D 1/18* (2013.01); *C21D 8/06* (2013.01);
(Continued)

(58) Field of Classification Search
None
See application file for complete search history.

(56) References Cited

U.S. PATENT DOCUMENTS 8,438,733 B2  5/2013  Jung
2002/0170636 A1  11/2002  Bilgen
(Continued)

FOREIGN PATENT DOCUMENTS

CN  101001969 A  7/2007
CN  102006948 A  4/2011
(Continued)

OTHER PUBLICATIONS

Int'l Search Report for PCT/EP2015/066154 dated Oct. 12, 2015 (dated Oct. 20, 2015).
(Continued)

Primary Examiner — Xiaowei Su
(74) Attorney, Agent, or Firm — thyssenkrupp North America, LLC

(57) ABSTRACT

A process for producing a spring or torsion bar from a steel wire by hot forming may involve providing a steel wire; thermomechanically forming the steel wire; cooling the steel wire thermomechanically; cutting the steel wire to length to give rods; heating the rods; hot forming the rods; and tempering the rods to give a spring or torsion bar, comprising quenching the rods to give a spring or torsion bar to a first cooling temperature, reheating the spring or torsion bar to a first annealing temperature, and cooling the spring or rod to a second cooling temperature. Further, in some (Continued)

examples, the cooling of the steel wire may be cooled to a temperature below a minimum recrystallization temperature such that at least a partly ferritic-pearlitic structure is established in the steel wire.

16 Claims, 3 Drawing Sheets

(51) Int. Cl.
 *C21D 8/06* (2006.01)
 *C21D 9/52* (2006.01)
 *B21F 3/02* (2006.01)
 *C21D 1/18* (2006.01)
 *F16F 1/04* (2006.01)

(52) U.S. Cl.
 CPC .............. *C21D 8/065* (2013.01); *C21D 9/02* (2013.01); *C21D 11/005* (2013.01); *C21D 2211/001* (2013.01); *C21D 2211/005* (2013.01); *C21D 2211/008* (2013.01); *C21D 2211/009* (2013.01); *F16F 1/04* (2013.01)

(56) References Cited

U.S. PATENT DOCUMENTS

| | | |
|---|---|---|
| 2006/0225819 A1 | 10/2006 | Yoshihara |
| 2006/0231175 A1 | 10/2006 | Vondracek et al. |
| 2009/0065105 A1 | 3/2009 | Kochi |
| 2010/0175795 A1* | 7/2010 | Choi ................. C21D 8/06 148/598 |
| 2012/0291927 A1 | 11/2012 | Hashimura |
| 2014/0060709 A1 | 3/2014 | Tange |
| 2015/0273565 A1* | 10/2015 | Jung .................. B21F 3/02 72/137 |
| 2016/0243607 A1* | 8/2016 | Takahashi ............ B21F 23/00 |

FOREIGN PATENT DOCUMENTS

| | | |
|---|---|---|
| CN | 102199692 A | 9/2011 |
| DE | 195 46 204 C1 | 3/1997 |
| DE | 198 39 383 C2 | 4/2000 |
| DE | 103 15 419 B | 5/2004 |
| DE | 103 15 418 B3 | 7/2004 |
| DE | 102011112077 A | 3/2013 |
| EP | 1 712 653 B1 | 10/2006 |
| EP | 1 801 253 A | 6/2007 |
| EP | 2 157 194 B | 10/2011 |
| EP | 2157194 B | 10/2011 |
| EP | 2 708 612 A | 3/2014 |
| JP | H06346146 A | 12/1994 |
| JP | 2006-291291 A | 10/2006 |
| JP | 2006-342400 A | 12/2006 |
| JP | 2009-068030 A | 4/2009 |
| JP | 2010-506052 A | 2/2010 |
| JP | 2010-133558 A | 6/2010 |
| JP | 2012-237040 A | 12/2012 |
| RU | 54947 U | 7/2006 |
| SU | 899683 A | 1/1982 |
| WO | 2010/134657 A1 | 11/2010 |
| WO | 2012/005373 A | 9/2013 |
| WO | 2014042066 A | 3/2014 |

OTHER PUBLICATIONS

Eckstein, Hans-Joachim: Technologie der Waermebehandlung von Stahl, 2. stark ueberarbeitete Auflage, Leipzig, VEB Deutscher Verlag fuer Grundstoffindustrie, 1987, p. 405, ISBN 3-342-00220-4.

* cited by examiner

METHOD FOR PRODUCING HOT-FORMED STEEL SPRINGS

CROSS REFERENCE TO RELATED APPLICATIONS

This application is a U.S. National Stage Entry of International Patent Application Serial Number PCT/EP2015/066154, filed Jul. 15, 2015, which claims priority to German Patent Application No. 10 2014 112 762.5 filed Sep. 4, 2014 as well as German Patent Application No. 10 2014 112 761.7 filed Sep. 4, 2014, the entire contents of both of which are incorporated herein by reference.

FIELD

The present disclosure generally relates to hot-formed springs and/or torsion bars, to processes for producing hot-formed springs and/or torsion bars, and to applications for steel wire for the production of hot-formed springs and/or torsion bars.

BACKGROUND

Springs and torsion bars made from formed steel wire are known in the prior art in a multitude of embodiments. Torsion bars are also referred to, for example, as torque rod springs, stabilization torque rods or torsion bar springs. Steel springs and torsion bar strings are used especially in motor vehicles, where steel springs are used, for example, to absorb road unevenness in shock absorber systems, and torsion bar springs to provide stabilization against tilting and distortion of the chassis, especially on motor vehicle cornering, on motor vehicle journeys over varying road surfaces and in the event of road unevenness. The shaping of the steel wire to give springs and torsion bars can be effected by a cold and/or hot forming method. Prior to this shaping, the steel wire can undergo various preparation steps which affect the spring and strength properties. For example, the spring steel used for production of a steel spring and/or torsion bar spring is subjected to a thermomechanical forming (TMF) operation, in order to increase its strength and toughness usable for construction purposes and to improve further specific use properties of a material. For instance, springs and/or torsion bars having high strength(s) can be produced with lower material input and hence low weight and material costs. The prior art discloses a number of different methods which comprise a thermal treatment and then a forming operation. In the case of cold forming, the formability of the steel wire is limited, since the toughness and formability thereof decreases as a result of cold solidification with an increasing degree of forming.

In the mass production of hot-formed helical springs, the TMF is already used in the form of a skew rolling process, but here only on prefabricated individualized spring rods. Such a process is disclosed in DE 103 15 418 B3. The TMF is effected on the spring rod by a one-stage skew rolling process directly prior to the hot winding of the helical springs. The hot-formed spring is quenched in oil, which results in a martensitic structure. DE 198 39 383 C2 describes a process for thermomechanical treatment of steel for torsion-stressed spring elements. A starting material is rapidly heated to a temperature of 1080° C. and austenitized. Subsequently, the starting material is subjected to a TMF, which achieves recrystallization. Subsequently, without intermediate cooling, the starting material is hardened by quenching.

This process is conducted in an integral manufacturing line in which all steps are conducted from the TMF up to the quenching. The direct concatenation of thermomechanical forming and tempering which is thus required results in the following disadvantages:

1. Changes in the length of the wire resulting from the thermomechanical forming, usually rolling, have a direct effect on the process parameters of the immediately subsequent hot forming and tempering.
2. The process times and temperatures of the thermomechanical forming, the hot winding and the tempering have to be matched to one another, which is difficult to implement in terms of process technology. This is because a preferred temperature for the thermomechanical forming is one just above the austenitization temperature of the wire material, while heating to a much higher temperature is advantageous for the hot forming and the tempering.
3. Between the TMF and the hot winding, further processing steps on the rod are required (for example cutting to an exact length), which extends the period before quench hardening. Therefore, the rod is kept at a very high temperature for a certain time, which can result in adverse changes in structure, for example grain growth and decarburization.
4. The TMF and the hot winding apparatus have different run times for each spring rod. The throughput of the manufacturing line would thus be defined by the slowest process component; the quicker process components are thus working not at capacity and therefore uneconomically.
5. A shutdown in any process component (for example for maintenance or because of a fault) shuts down the entire manufacturing line.
6. For every winding system, a separate TMF unit has to be kept ready. In the case of a multitude of steel springs to be manufactured simultaneously, this means a corresponding number of TMF units.
7. The processing of spring rods with non-constant wire diameter is currently possible with an integral manufacturing line only with a considerable degree of control complexity, if at all.
8. The one-stage skew rolling operation employed in the manufacturing of springs for thermomechanical forming (corresponding to the abovementioned DE 103 15 418 B3) leads to rotation of the wire about its longitudinal axis at a speed of 400 rpm or more. This can be conducted with individualized spring wires, but not in the case of a continuous wire. It is already known that a two-stage caliber rolling operation can be used instead of skew rolling. However, the above disadvantages 1 to 7 also exist when caliber rolling is employed.

DETAILED DESCRIPTION

Figure 1:
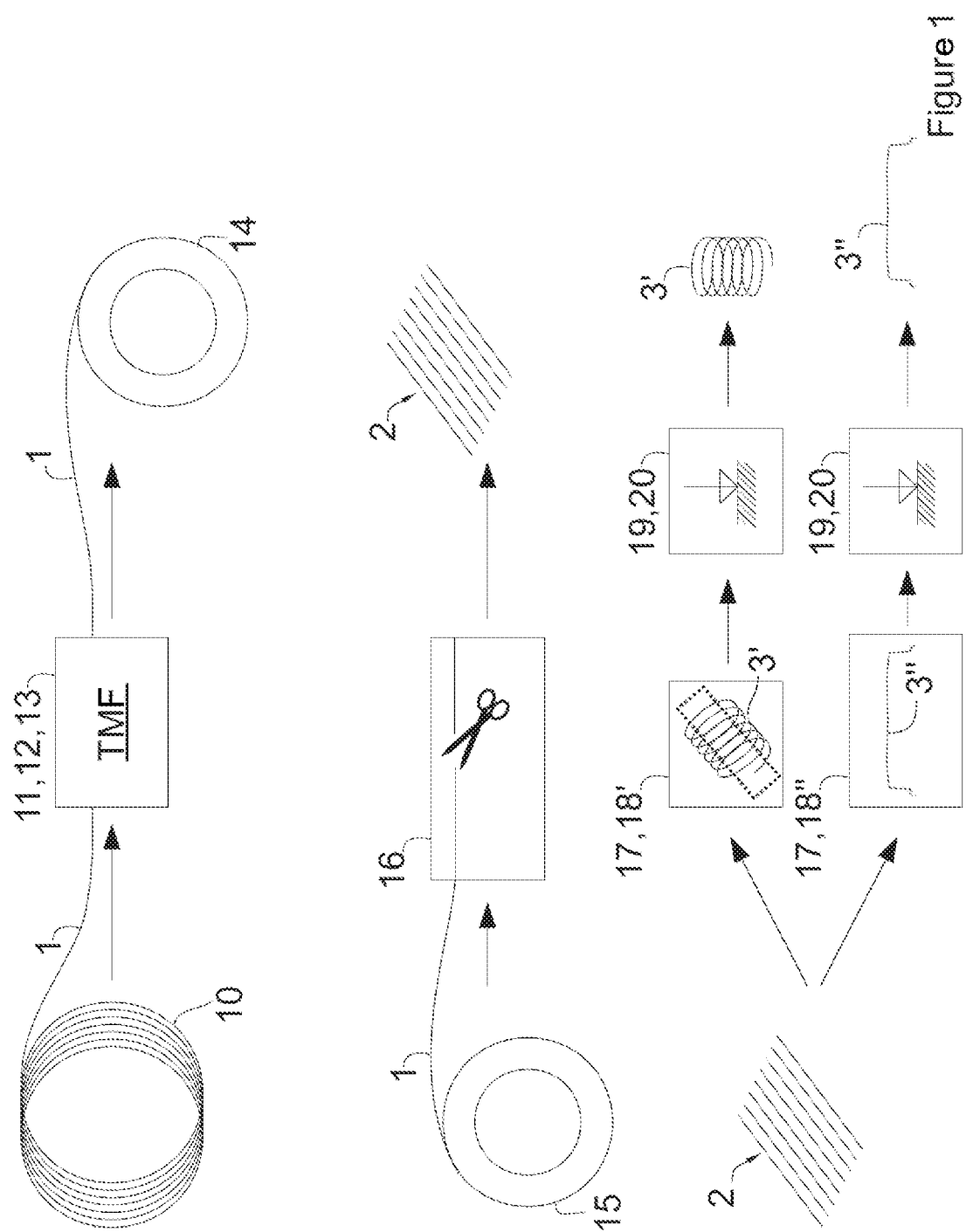
FIG. 1 is a schematic diagram of an example process of the present disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

It is therefore an object of the present invention to provide an improved spring and/or torsion bar and an improved process for producing the improved spring and/or torsion bar where the aforementioned disadvantages are avoided. More particularly, the improved process for producing the improved spring and torsion bar is to provide a more stable manufacturing process with reliable fulfilment of high quality demands. Moreover, the improved process for producing the improved spring and/or torsion bar is to be implementable in a simple and reliable manner in existing processes.

The spring of the invention has the advantage over conventional springs that the spring wire of the invention has higher toughness compared to conventional spring wires. Because of the higher toughness of the spring wire, the spring of the invention can be subjected to higher stresses.

Further advantages of the spring of the invention are a lower weight compared to conventional springs and a longer lifetime. Moreover, the spring of the invention, compared to conventional springs, can especially be designed with smaller dimensions and a shorter spring length, which means that the spring of the invention can also be disposed in small spaces.

The torsion bar of the invention has the advantage over conventional torsion bars that the spring wire of the invention has higher toughness compared to conventional spring wires. Because of the higher toughness of the spring wire, the torsion bar of the invention can be subjected to higher stresses. A further advantage of the torsion bar of the invention is a longer lifetime compared to conventional torsion bars.

The process of the invention for producing springs and/or torsion bars has the advantage over conventional processes that the spring and/or torsion bar of the invention has a spring wire having a higher toughness compared to conventional spring wires. A further advantage of the process of the invention is that it can be integrated simply and reliably into existing processes. Moreover, the process of the invention has the advantages that the separation of TMF and tempering in the process allows the optimal process parameters, for example temperatures, to be established for each of the steps, the separation of TMF from the downstream manufacturing steps in the process allows the optimal throughput rates to be established for each of the steps, any processing steps additionally needed on the steel wire and/or rod, for example precise cutting to a desired length or the production of non-constant steel wire and/or rod diameters, can be undertaken without prolonging the duration of the process before the quench hardening, the risk that there will be adverse changes in structure in the steel wire and/or rod as a result of holding at high temperature for a long period is reduced, the shutdown of any process component (for example for maintenance or because of a defect) does not have any adverse effects on the entire manufacturing line and the other process steps can continue production, there is no need to keep a separate TMF unit ready for every winding system, and the flexibility of production has increased since the selection of winding system to be used can be made independently of the TMF unit, the processing of spring rods at a non-constant, especially varying, wire diameter is possible by the process of the invention in a simple manner and without increased complexity.

The invention therefore provides a spring and/or torsion bar produced from a steel wire by hot forming by a process comprising the following steps:

a) providing a steel wire;

b) thermomechanically forming the steel wire provided in step a) above the minimum recrystallization temperature of the steel wire, said steel wire having at least partly austenitic structure;

c) cooling the steel wire thermomechanically formed in step b);

d) cutting the steel wire cooled in step c) to length to give rods;

e) heating the rods cut to length in step d) at least to a forming temperature, the forming temperature being a temperature above the minimum recrystallization temperature of the steel wire, preferably equal to or greater than the austenite start temperature;

f) hot forming the rods heated in step e) to give a spring or torsion bar;

g) tempering the rods hot-formed in step f) to give a spring or torsion bar, comprising I. quenching the rods hot-formed in step f) to give a spring or torsion bar to a first cooling temperature, the first cooling temperature being a temperature below the minimum recrystallization temperature of the steel wire, and an at least partly martensitic structure being established;

II. reheating the spring quenched in step I. or torsion bar to a first annealing temperature which is less than the austenite start temperature;

III. cooling the hot-formed spring rods reheated in step II. to a second cooling temperature, the second cooling temperature being at least less than the first annealing temperature;

wherein with cooling of the steel wire in step c) to a temperature below the minimum recrystallization temperature it is cooled such that at least a partly ferritic-pearlitic structure is established in the steel wire.

The invention further provides a process for producing a spring and/or torsion bar, comprising the steps of:

a) providing a steel wire;

b) thermomechanically forming the steel wire provided in step a) above the minimum recrystallization temperature of the steel wire, said steel wire having at least partly austenitic structure;

c) cooling the steel wire thermomechanically formed in step b);

d) cutting the steel wire cooled in step c) to length to give rods;

e) heating the rods cut to length in step d) at least to a forming temperature, the forming temperature being a temperature above the minimum recrystallization temperature of the steel wire, preferably equal to or greater than the austenite start temperature;

f) hot forming the rods heated in step e) to give a spring or torsion bar;
g) tempering the rods hot-formed in step f) to give a spring or torsion bar, comprising
   I. quenching the rods hot-formed in step f) to give a spring or torsion bar to a first cooling temperature, the first cooling temperature being a temperature below the minimum recrystallization temperature of the steel wire, and an at least partly martensitic structure being established;
   II. reheating the spring quenched in step I. or torsion bar to a first annealing temperature which is less than the austenite start temperature;
   III. cooling the hot-formed spring rods reheated in step II. to a second cooling temperature, the second cooling temperature being at least less than the first annealing temperature;
wherein with cooling of the steel wire in step c) to a temperature below the minimum recrystallization temperature it is cooled such that at least a partly ferritic-pearlitic structure is established in the steel wire.

The process of the invention is characterized in that the wire (if the cutting-to-length follows after the cooling) or the spring rod (if the cutting-to-length precedes the cooling) is cooled after the thermomechanical forming to a temperature below 200° C. such that a pearlitic-ferritic structure is established in the cooled wire or spring rod. The formation of the pearlitic-ferritic structure puts the wire or spring rod in an intermediate state in which it features high softness and hence also good amenability to handling. Because of this softness, it is possible to achieve separation of the TMF from the subsequent hot forming and tempering in the process. In the period between the TMF and the hot forming or tempering, the wire or spring rod has much better amenability to handling, since it is not in a hardened form. Thus, the wire or spring rod can then be subjected separately to further processing steps, for example drawing, fine grinding or exact cutting-to-size. This is also possible in an improved manner, since the wire or spring rod in this state, because of the TMF, already has a fine structure, but is nevertheless soft and cold and hence has good processability.

The invention further provides for the use of a steel wire for production of hot-formed springs and/or torsion bars, comprising the steps of:
a) providing a steel wire;
b) thermomechanically forming the steel wire provided in step a) above the minimum recrystallization temperature of the steel wire, said steel wire having at least partly austenitic structure;
c) cooling the steel wire thermomechanically formed in step b);
d) cutting the steel wire cooled in step c) to length to give rods;
e) heating the rods cut to length in step d) at least to a forming temperature, the forming temperature being a temperature above the minimum recrystallization temperature of the steel wire, preferably equal to or greater than the austenite start temperature;
f) hot forming the rods heated in step e) to give a spring or torsion bar;
g) tempering the rods hot-formed in step f) to give a spring or torsion bar, comprising
   I. quenching the rods hot-formed in step f) to give a spring or torsion bar to a first cooling temperature, the first cooling temperature being a temperature below the minimum recrystallization temperature of the steel wire, and an at least partly martensitic structure being established;
   II. reheating the spring quenched in step I. or torsion bar to a first annealing temperature which is less than the austenite start temperature;
   III. cooling the hot-formed spring rods reheated in step II. to a second cooling temperature, the second cooling temperature being at least less than the first annealing temperature;
wherein with cooling of the steel wire in step c) to a temperature below the minimum recrystallization temperature it is cooled such that at least a partly ferritic-pearlitic structure is established in the steel wire.

The formation of a pearlitic-ferritic structure puts the wire in an intermediate state in which the wire features high softness and hence also good amenability to handling. Because of this softness, it is possible to achieve separation of the TMF from the subsequent tempering in the process. In the period between the TMF and the tempering, the wire has much better amenability to handling, since it is not in a hardened form.

The invention can be implemented either in a spring or in a torsion bar, or else in a spring wire of the invention, or else in a process for producing the spring and/or torsion bar, or else the spring wire, and also in the use of a steel wire for production of the spring and/or torsion bar.

In the context of the present invention, a spring is understood to mean a component made from a steel wire which yields under stress and, after the stress is relieved, returns to its original state. More particularly, a spring may be a component wound in helical or spiral form from steel wire or stretched or bent in the form of a rod. Examples of springs are selected from a group of helical springs, especially helical compression springs, helical tension springs, conical springs, elastic springs, flexible springs, especially spiral springs, wound torsion springs and combinations thereof.

In the context of the present invention, a torsion bar is understood to mean a bar element wherein, when the torsion bar is fixed at both ends, the secured ends perform a pivoting motion about the axis of the bar element with respect to one another. More particularly, the mechanical stress takes place to a crucial degree through a torque that engages tangentially with respect to the rod element axis. Torsion bars are also understood, for example, to mean a straight torsion bar, an angular torsion bar, a torsion bar spring, a torsion spring, a stabilization torsion bar, a stabilizer, a divided stabilizer and combinations thereof.

Hot forming in the context of the present invention is understood to mean forming of the steel wire above the recrystallization temperature. More particularly, the material recrystallizes, for example steel during or immediately after the hot forming, as a result of which the material recovers its original properties. More particularly, the properties of the materials are improved in the TMF. For example, hot forming is referred to as recrystallization of the material structure simultaneously with forming. Examples of hot forming are hot winding, hot bending and combinations thereof.

The recrystallization temperature is that calcining temperature which, in the case of a cold-formed structure with a given degree of forming, leads to complete recrystallization within a limited period of time. The recrystallization temperature does not have a fixed value but depends on the extent of the prior cold forming and the melting temperature of the material, especially the melting temperatures of steels.

For example, in the case of steels, the recrystallization temperature is also dependent on the carbon content and the alloy of the particular steel.

The minimum recrystallization temperature is understood to mean the lowermost temperature at which there is still recrystallization, especially recrystallization of the structure of a steel wire.

Austenite start temperature in the context of the invention is understood to mean a temperature at which there is transformation to an at least partly austenitic structure. More particularly, at an austenitization temperature, there is transformation to an at least partly austenitic structure.

Tempering in the context of the present invention may be partial or complete tempering.

A heat transfer, as occurs, for example, in step b) in the thermomechanical forming, in step e) in the heating, in step g)II. in the reheating and/or another heat transfer in the context of the invention, is understood to mean one selected from conduction of heat, especially conductive heating, radiation of heat, especially infrared radiation, heating by induction, convection, especially a heated fan, and combinations thereof.

A stabilizer in the context of the invention is also understood to mean a stabilization torsion bar. More particularly, sections of stabilizers and/or divided stabilizers are also understood to mean stabilizers of the invention.

The reheating in step g)II. together with the subsequent cooling in step g)III. is understood to mean annealing.

In a preferred embodiment of the invention, the production of the spring and/or torsion bar is conducted with a steel wire having a carbon content in the range from 0.02% to 0.8% by weight. More particularly, in the context of the invention, steels having a carbon content in the range from 0.02% to 0.8% by weight are understood to mean hypoeutectoid steels.

In a preferred embodiment of the invention, the sequence of steps c) and d) and/or of steps d) and e) is as desired.

In a preferred embodiment of the invention, the thermomechanical forming in step b) is effected at a temperature equal to or greater than the austenite start temperature, preferably equal to or greater than the austenite end temperature, more preferably in the range from the austenite end temperature to 50° C. greater than the austenite end temperature.

Austenite end temperature in the context of the invention is understood to mean a temperature at which the transformation to an austenitic structure is complete.

Thus, in a preferred embodiment, it is envisaged that, in this intermediate state, i.e. after the TMF and prior to the tempering, the wire, which is still in the form of a continuous wire, is rolled up, especially coiled, for storage or transport purposes. The softer the wire, the more easily this is possible. For the subsequent tempering, the wire is uncoiled again. The subsequent tempering is thus completely decoupled from the TMF.

The process sequence of the invention also enables decoupling of the tempering from the TMF with regard to the temperature range. While the optimal forming temperature during the TMF is just above the austenitization temperature of the wire material, especially less than 50° C. above the austenitization temperature of the wire material, heating to significantly higher temperatures is advantageous for the tempering. Thus, in a preferred configuration, the tempering temperature is above the forming temperature, especially more than 50° C. above the austenitization temperature of the wire material. The separation of TMF and tempering in the process allows the optimal temperature to be established for each of the two steps.

A further advantage of the process sequence of the invention is that the decoupling of the two processes of tempering and TMF allows both processes to be conducted at (required) throughput rates of the wire that are optimal for the particular process. The throughput rate of the wire in the TMF is not necessarily the same as in the tempering. In the integral manufacturing line, by contrast, the slower of the two processes sets the throughput rate for both processes, meaning that one of the two processes does not work under optimal conditions, i.e. works in an uneconomic manner.

The steel spring preferably still has a temperature above the austenite start temperature after the hot forming. If the steel spring has a temperature equal to or less than the austenite start temperature after the hot forming, the steel spring is reheated to a temperature above the austenite start temperature. Proceeding from this temperature above the austenite start temperature, the quenching can then be effected in the course of the tempering.

Preferably, the quenching, however, is effected without intermediate cooling below the austenitization temperature after the hot forming. The process heat from the hot forming process is thus utilized for the tempering.

This process is preferably conducted in the production of hot-formed steel springs where the individual spring rods are separated from the wire prior to the hot forming.

Preferably, the process is employed in the production of hot-formed helical springs. In this case, the spring rod is hot-wound to give steel springs; only after the hot winding is the helical spring tempered.

Likewise preferably, the process is employed in the production of hot-formed torsion bar springs. In this case, the spring rod is processed further by hot bending to give torsion bar springs, especially stabilizers for motor vehicle chassis; only after the hot bending is the torsion bar spring tempered.

In a preferred embodiment of the invention, the cooling of the wire in step c) is effected at least to a temperature below the minimum recrystallization temperature, preferably below a temperature of 200° C., more preferably below a temperature of 90° C.

The cooling after the TMF is preferably effected at such a low cooling rate as to ensure that a pearlitic-ferritic structure is established. For this purpose, the person skilled in the art is able to employ the TTT diagram corresponding to the material, from which it is possible to read off the cooling rate.

In principle, the procedure proposed appears to be uneconomic compared to the known process, since the wire now has to be reheated for the hot forming process after the intermediate cooling. However, it has been found that the decoupling achieved thereby avoids the disadvantages mentioned at the outset, which can be assessed as being better in technical terms and more economically advantageous than the advantages resulting from the integral manufacture. In addition, the intermediate cooling can also be effected in a controlled manner with involvement of a heat exchanger, by means of which the waste heat from the cooling can again be available to the TMF or the subsequent tempering with quite a high efficiency.

According to the invention, it is now possible to use an already pretreated wire for production of hot-formed steel springs, especially helical springs or torsion bar springs made from steel. The wire has a temperature of less than 200° C., especially room temperature. Moreover, the wire has already been subjected to a thermomechanical forming operation and has a pearlitic-ferritic structure. In addition, the steel wire has already been cut to length to give bars. These bars are now tempered, the tempering comprising the following steps: heating of the wire to a tempering temperature above the austenitization temperature of the wire material and austenitization. Subsequently, the bars are hot formed to produce the hot-formed steel springs and then the bars heated to tempering temperature are quenched to form a martensitic structure in the bar; annealing of the wire. The advantages and developments that have been mentioned with regard to the process are applicable to this use.

In a preferred embodiment of the invention, the rods are heated in step e) to a temperature equal to or greater than the austenite start temperature, preferably equal to or greater than the austenite end temperature, more preferably in the range from the austenite end temperature to 50° C. greater than the austenite end temperature.

In a preferred embodiment of the invention, the quenching in step g)I. of the spring hot-formed in step f) or the rod causes the spring or rod structure to undergo at least partial conversion to martensite and the spring or the rod to be exposed to at least a martensite start temperature, whereby the quenching of the steel wire is preferably carried out to the first cooling temperature of the steel wire of less than or equal to 200° C.

Martensite start temperature in the context of the invention is understood to mean a temperature at which there is transformation to an at least partly martensitic structure.

In a preferred embodiment of the invention, the tempering of the rods hot-formed to give a spring or torsion bar in step g) establishes the hardness profile over the cross section of the steel wire. For example, the hardness of the steel wire can vary from the edge to the core of the steel wire. More particularly, the hardness can drop or rise or else be equal from the edge to the core of the steel wire. Preferably, the hardness drops from the edge to the core of the steel wire. For example, this can be effected by edge heating of the steel wire with subsequent recooling after one of steps d) to g).

In a preferred embodiment of the invention, after step g), in a further step h), edge heating and subsequent re-cooling of the rods hot-formed to give a spring or torsion bar is carried out, whereby the hardness increases from the edge to the core of the hot-formed spring bars.

In a preferred embodiment of the invention, after step c), in a further step i), the steel wire is coiled.

In a preferred embodiment of the invention, after one of steps c) to g), in a further step k), hot shot-blasting of the steel wire and/or the rods hot-formed to give a spring or torsion bar is carried out at a hot jetting temperature which is less than the first annealing temperature, especially within a hot jetting temperature range from 150° C. to 500° C.

In a preferred embodiment of the invention, after one of steps c) to g), in a further step j), a surface treatment of the steel wire and/or the rods hot-formed to give a spring or torsion bar is carried out, in which the surface of the steel wire and/or of the rods hot-formed to give a spring or torsion bar is at least partly removed.

In a preferred embodiment of the invention, the springs produced and/or the torsion bar have a martensite content of greater than 40% by volume, preferably greater than 80% by volume, more preferably greater than 90% by volume, most preferably greater than 95% by volume.

In a preferred embodiment of the invention, the process is conducted with a steel wire having a carbon content in the range from 0.02% to 0.8% by weight.

In a preferred embodiment of the invention, production of hot-formed springs and/or torsion bars is accomplished using a steel wire having a carbon content in the range from 0.02% to 0.8% by weight.

PREFERRED WORKING EXAMPLE OF THE INVENTION

Figure 2:
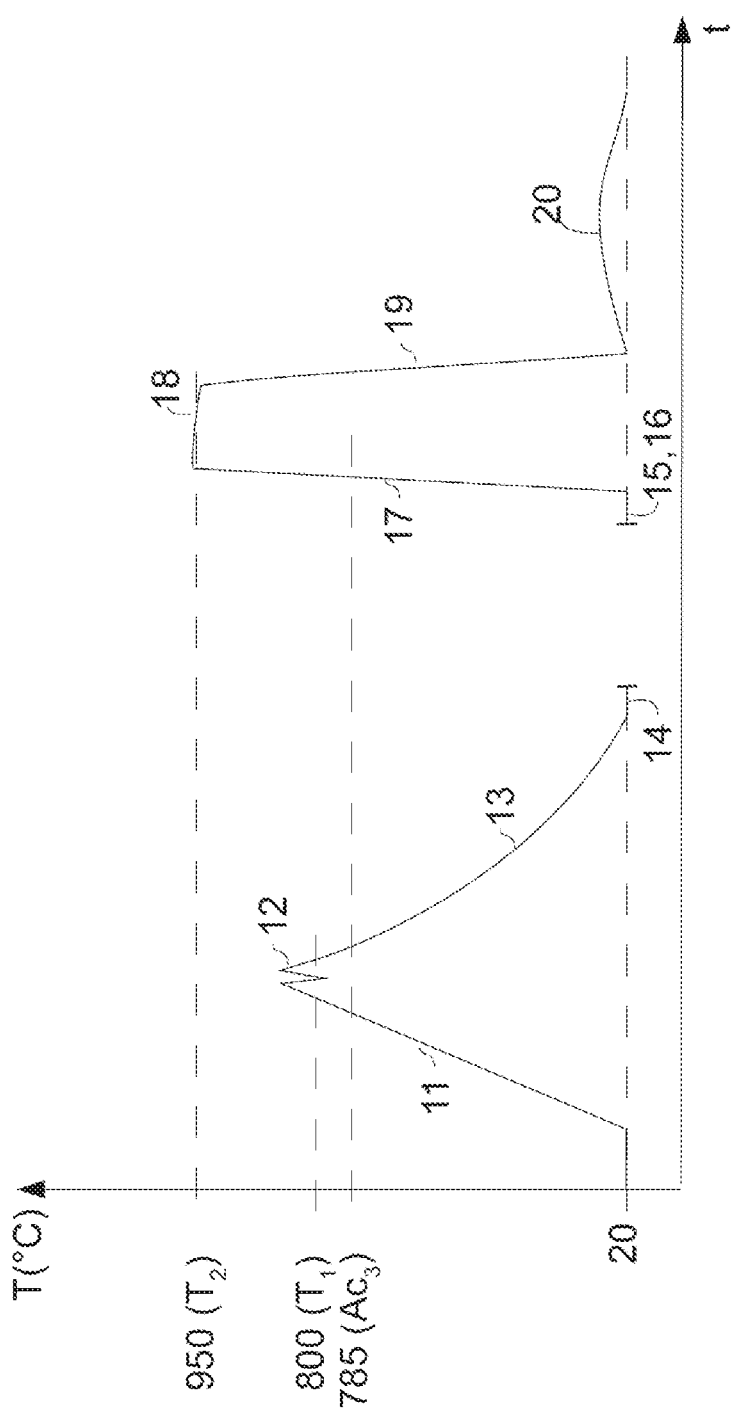
FIG. 2 is a temperature profile for the example process of FIG. 1.

FIGS. 1 and 2 are described together hereinafter. A wound steel wire 1 is provided on a ring 10. This is at first heated to a first forming temperature $T_1$ of about 800° C., which is above minimum recrystallization temperature of the steel wire 1s, especially above the austenitization temperature $Ac_3$ of in the present case 785° C., 11. Then the steel wire 1 is subjected to thermomechanical forming 12. The heating 11 can be dispensed with when the TMF immediately follows the steel wire rolling process and the temperature of the steel wire 1s is still at the desired forming temperature $T_1$.

The thermomechanical forming 12 can be effected by multistage caliber rolling. Subsequently, the steel wire 1 is cooled 13 at such a slow rate that a pearlitic-ferritic structure, i.e. a soft structure, is established in the steel wire 1. The cooling can be effected without any further intervention by simple storage at room temperature or ambient temperature, but the cooling is preferably effected in a controlled manner. The cooling can additionally or alternatively also be effected during or after the coiling 14 of the steel wire 1, which is readily possible because of the soft microstructural state. For cooling, a heat exchanger may be provided, such that the waste heat can be fed back to the process.

When the steel wire 1 is then coiled, it can be transported from one processing site to the next processing site and processed further there. In FIG. 2, this is illustrated by a gap in the temperature profile after the coiling 14. A spring manufacturer can then purchase the steel wire 1 pretreated by thermomechanical forming 12 from a steel wire manufacturer, and need not keep the equipment required for the TMF in house. This saves space and capital costs for the spring manufacturer.

After any desired period of storage and/or transport, the hot forming 18', 18" and tempering of the steel wire 1 commences, and consequently need not follow the TMF directly (or even in terms of location). After uncoiling 15, the steel wire 1 is cut 16 into individual rods 2. In connection with the cutting of the steel wire 1, it is possible for further processing steps to be conducted on the steel wire 1 or on the cut rod 2, for example cleaning, straightening, grinding and/or peeling.

Subsequently, for preparation for the hot forming 18', 18", the rod 2 is heated 17 to a second forming temperature $T_2$ above the austenitization temperature $Ac_3$. In the present case, the second forming temperature $T_2$ is about 950° C. The heating is effected very quickly and is preferably conducted by inductive or conductive means. The heating is effected at a heating rate of at least 50 K/s, preferably at least 100 K/s. Subsequently, the bar 2 is subjected to hot winding 18' to give the spiral spring 3' or to hot bending 18" to give the torsion bar 3". Without any significant change in temperature (although the temperature of the spring 3 can quite possibly be slightly reduced during the hot forming 18', 18" and prior to the quenching), the quenching 19 is effected, for example, in an oil bath, which establishes a martensitic structure in the spring 3 produced. Subsequently, the spring 3 is annealed 20.

Figure 3:
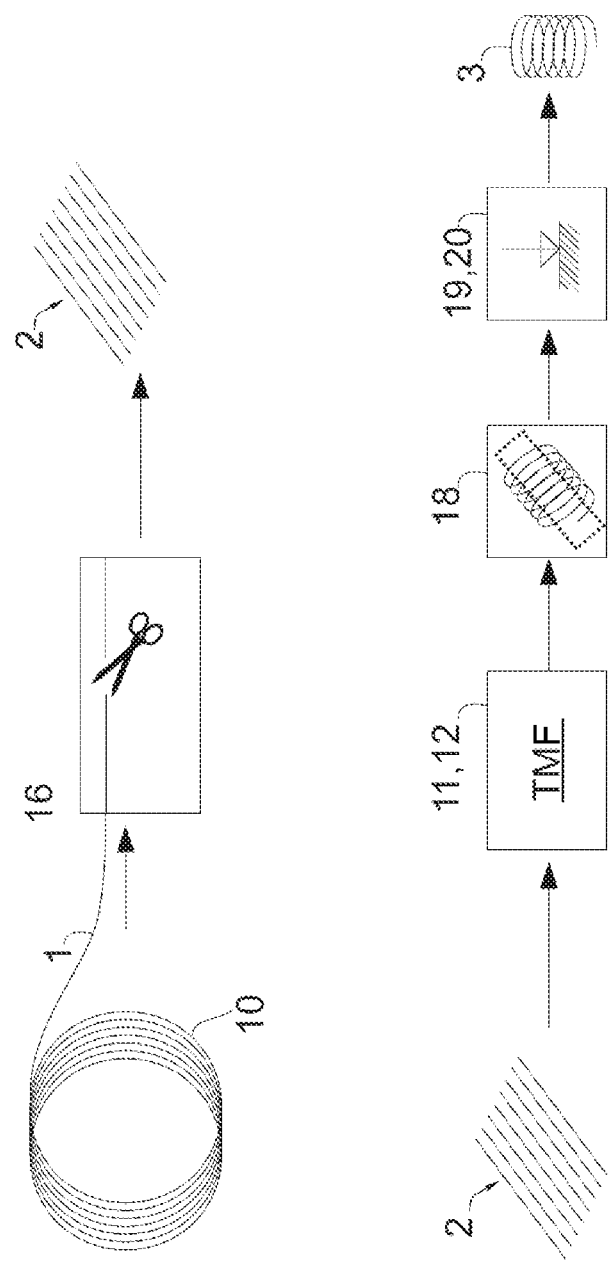
FIG. 3 is a schematic diagram of a prior art process.

The process according to prior art is shown in schematic form in FIG. 3. In a departure from the inventive concept, the cutting to give the bars 2 precedes the performance of the TMF. The TMF 12 was conducted in an integral manufacturing line together with the hot forming 18, 18', 18" and the quenching 19. The steel wire 1 heated for the TMF was kept at a temperature above the austenitization temperature apart from the quenching.

In terms of its execution, the invention is not restricted to the preferred working example specified above. Instead, there is a number of conceivable variants which make use of the solution presented even in executions of a fundamentally different kind. All the features and/or advantages that are apparent from the claims, description or drawings, including details of construction or three-dimensional arrangements, may be essential to the invention either on their own or in a wide variety of different combinations.

INDUSTRIAL APPLICABILITY

Springs and/or torsion bars of the above-described type are used, for example, in the production of motor vehicles, especially of motor vehicle chassis.

LIST OF REFERENCE SIGNS

1 steel wire
2 rod
3 spring
3' helical spring
3" torsion bar
10 ring
11 heating
12 thermomechanical forming (TMF)
13 cooling
14 coiling
15 uncoiling
16 cutting to length
17 heating
18 hot forming
18' hot winding
18" hot bending
19 quenching
20 annealing

What is claimed is:

1. A process for producing a spring or torsion bar from a steel wire by hot forming, the process comprising:
   providing a steel wire;
   thermomechanically forming the steel wire above a minimum recrystallization temperature of the steel wire, the steel wire having an at least partly austenitic structure, wherein the thermomechanical forming occurs at a temperature in a range between an austenite end temperature and 50° C. above the austenite end temperature;
   cooling the thermomechanically-formed steel wire such that at least a partly ferritic-pearlitic structure is formed in the steel wire;
   cutting the steel wire to length to form rods;
   heating the rods at least to a forming temperature, the forming temperature being above the minimum recrystallization temperature of the steel wire;
   hot forming the heated rods;
   tempering the hot-formed rods, wherein the tempering comprises:
      quenching the rods to a first cooling temperature such that an at least partly martensitic structure forms in the steel wire and such that the spring or the torsion bar that is produced has a martensite content of greater than 40% by volume, the first cooling temperature being a temperature below the minimum recrystallization temperature of the steel wire,
      reheating the quenched rods to a first annealing temperature that is less than an austenite start temperature, and
      cooling the reheated rods to a second cooling temperature, the second cooling temperature being less than the first annealing temperature.

2. The process of claim 1 wherein the cooling of the steel wire to the temperature below the minimum recrystallization temperature occurs before the steel wire is cut to length to form the rods.

3. The process of claim 1 wherein the steel wire is cut to length to form the rods from the steel wire before the rods are heated to the forming temperature.

4. The process of claim 1 wherein the cooling of the thermomechanically-formed steel wire is effected to a temperature below the minimum recrystallization temperature.

5. The process of claim 1 wherein the cooling of the thermomechanically-formed steel wire is effected to a temperature below 200° C.

6. The process of claim 1 wherein the cooling of the thermomechanically-formed steel wire is effected to a temperature below 90° C.

7. The process of claim 1 wherein the quenching causes the rods to at least partially convert to martensite and to be exposed to at least a martensite start temperature, wherein the first cooling temperature is less than or equal to 200° C.

8. The process of claim 1 wherein the tempering establishes a hardness profile over a cross section of the rods.

9. The process of claim 1 further comprising coiling the steel wire after cooling the thermomechanically-formed steel wire.

10. The process of claim 1 wherein after the cooling, the cutting, the heating, the hot forming, or the tempering, the process further comprises surface treating the steel wire or the rods to create the spring or torsion bar, wherein the surface treating comprises at least partly removing a surface of the steel wire or the rods.

11. A process for producing a spring or torsion bar from a steel wire by hot forming, the process comprising:
   providing a steel wire;
   thermomechanically forming the steel wire above a minimum recrystallization temperature of the steel wire, the steel wire having an at least partly austenitic structure;
   cooling the thermomechanically-formed steel wire such that at least a partly ferritic-pearlitic structure is formed in the steel wire;
   cutting the steel wire to length to form rods;
   heating the rods at least to a forming temperature, the forming temperature being above the minimum recrystallization temperature of the steel wire;
   hot forming the heated rods;
   tempering the hot-formed rods, wherein the tempering comprises:
      quenching the rods to a first cooling temperature such that an at least partly martensitic structure forms in the steel wire and such that the spring or the torsion bar that is produced has a martensite content of greater than 40% by volume, the first cooling temperature being a temperature below the minimum recrystallization temperature of the steel wire,
      reheating the quenched rods to a first annealing temperature that is less than an austenite start temperature, and cooling the reheated rods to a second cooling temperature, the second cooling temperature being less than the first annealing temperature, wherein the steel wire is cut to length to form the rods from the steel wire before the cooling of the steel wire to the temperature below the minimum recrystallization temperature occurs.

12. The process of claim 11 wherein the forming temperature to which the rods are heated is equal to or greater than the austenite start temperature.

13. The process of claim 11 wherein the forming temperature to which the rods are heated is equal to or greater than an austenite end temperature.

14. The process of claim 11 wherein the thermomechanical forming occurs at a temperature equal to or greater than the austenite start temperature.

15. The process of claim 11 wherein the thermomechanical forming occurs at a temperature equal to or greater than an austenite end temperature.

16. A process for producing a spring or torsion bar from a steel wire by hot forming, the process comprising:

providing a steel wire;

thermomechanically forming the steel wire above a minimum recrystallization temperature of the steel wire, the steel wire having an at least partly austenitic structure;

cooling the thermomechanically-formed steel wire such that at least a partly ferritic-pearlitic structure is formed in the steel wire;

cutting the steel wire to length to form rods;

heating the rods at least to a forming temperature, the forming temperature being above the minimum recrystallization temperature of the steel wire;

hot forming the heated rods;

tempering the hot-formed rods, wherein the tempering comprises:

quenching the rods to a first cooling temperature such that an at least partly martensitic structure forms in the steel wire and such that the spring or the torsion bar that is produced has a martensite content of greater than 40% by volume, the first cooling temperature being a temperature below the minimum recrystallization temperature of the steel wire, reheating the quenched rods to a first annealing temperature that is less than an austenite start temperature, and cooling the reheated rods to a second cooling temperature, the second cooling temperature being less than the first annealing temperature; and edge heating and then re-cooling the rods after the tempering, wherein a hardness of the rods increases from an edge to a core of the rods.

* * * * *